United States Patent
Kunz et al.

(10) Patent No.: US 10,332,201 B1
(45) Date of Patent: Jun. 25, 2019

(54) BUNDLED FINANCIAL ACCOUNTS

(75) Inventors: Thomas Kunz, Pittsburgh, PA (US); Michael Ley, Moon Township, PA (US); Matthew Edward Steenson, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 297 days.

(21) Appl. No.: 12/489,555

(22) Filed: Jun. 23, 2009

Related U.S. Application Data

(60) Provisional application No. 61/074,772, filed on Jun. 23, 2008.

(51) Int. Cl.
*G06Q 20/00* (2012.01)
*G06Q 20/10* (2012.01)
*G06Q 40/02* (2012.01)

(52) U.S. Cl.
CPC ............. *G06Q 40/02* (2013.01); *G06Q 20/00* (2013.01); *G06Q 20/10* (2013.01)

(58) Field of Classification Search
USPC ......... 235/279; 715/763; 705/39, 40, 41, 45, 705/37, 38
See application file for complete search history.

(56) References Cited

U.S. PATENT DOCUMENTS

| | | | |
|---|---|---|---|
| 5,866,889 A | | 2/1999 | Weiss et al. |
| 6,049,782 A | | 4/2000 | Gottesman et al. |
| 7,546,945 B1 * | | 6/2009 | Bucci ................ G06Q 20/10 235/379 |
| 7,792,748 B1 * | | 9/2010 | Ebersole ............. G06Q 20/10 705/39 |
| 2003/0225688 A1 * | | 12/2003 | Dobbins ..................... 705/39 |
| 2004/0088261 A1 * | | 5/2004 | Moore et al. ............... 705/64 |
| 2005/0075975 A1 * | | 4/2005 | Rosner et al. .............. 705/40 |
| 2006/0074804 A1 * | | 4/2006 | Cinar ................ G06Q 20/108 705/42 |
| 2006/0106693 A1 * | | 5/2006 | Carlson et al. ............. 705/35 |
| 2006/0167771 A1 * | | 7/2006 | Meldahl ..................... 705/30 |
| 2007/0130062 A1 | | 6/2007 | Huh |
| 2008/0027844 A1 * | | 1/2008 | Little et al. ................. 705/35 |
| 2008/0228615 A1 | | 9/2008 | Scipioni et al. |

OTHER PUBLICATIONS

MaPSCU: Rates, Printed from https://mapscu.com/Rates/Rates.aspx?Tab=Business on Jun. 4, 2008.

* cited by examiner

*Primary Examiner* — Tien C Nguyen
(74) *Attorney, Agent, or Firm* — Buchanan Ingersoll & Rooney PC; Robert J. Pugh

(57) ABSTRACT

A computer-assisted method of presenting a plurality of financial accounts as a unitary financial account. The method includes displaying, on a graphical display, a graphical representation of a first financial account and displaying, on the graphical display, a graphical representation of a second financial account, wherein the graphical representation of the first financial account and the graphical representation of the second financial account are displayed as a unitary graphical representation that conveys to a user that the first financial account and the second financial account are a partitioned unitary financial account. The method also includes enabling the user to transfer monetary funds between the first financial account and the second financial account by manipulation of the unitary graphical representation.

12 Claims, 4 Drawing Sheets

| My Accounts | Transfer Funds | Profile Settings | My Offers | | Sign Off |

| My Money $1578.04 | Growth $3288.00 | Credit Card $200.84 | Other $5311.00 | Liability $200.34 | Assets $10823.04 |

| Calendar | Account Detail | Recent Activities | Bills | Savings Rules | Alerts |

TotalAvailable Today: $1374.44 (with Reserve: $1578.44)

10 → 18 — Scheduled out $687.14 | Free $687.30 — 20  16 — Growth Balance — 11

Available: $1374.44     Reserve: $204.00

22    12    26    14

Scheduled Out   (Add Bill)

Cellular
Scheduled for 8/19/07        $57.14

Insurance
Scheduled for 9/23/07        $500.00

Total Scheduled Out:         $687.14

Reserve   (Add Item) (Edit)

Items you are saving for:
  iPhone        $355.00    $50.00
  New Laptop    $965.00    $30.00

Unallocated:              $124.00

Intersection Reserve: $0.50

Total Savings:           $204.00

Transfer Money: From: (Select Account)  To: (Select Account)  Amount: $ [  ] (Go)

24

Future Scheduled Out (After Sept. 25th)

Electric
Scheduled for 10/03/07                         $26.39

Insurance
Scheduled for 10/16/07                         $83.00

Total Future Scheduled Out:                    $654.28

FIG. 1

BUNDLED FINANCIAL ACCOUNTS

CROSS REFERENCE TO RELATED APPLICATION

The present application claims priority to U.S. Provisional Application No. 61/074,772 filed Jun. 23, 2008.

BACKGROUND

Financial services entities often offer various types of accounts to their customers. For example, checking, savings, investment and other accounts are often offered. Also, variations of such offered. Also, variations of such accounts may be offered by a financial services entity. For example, checking accounts may be offered that are interest bearing or non-interest bearing, include or exclude certain fees (e.g., fees for check usage, ATM usage, etc.), have varying interest rate structures, etc. In order for a customer to take advantage of multiple accounts, the customer has to open each account and manage each account, either online, at automated teller machines (ATMs), in person, etc., separately. Thus, for example, when the customer wants to transfer funds between accounts using an online banking interface, the customer has to select accounts as the source and destination accounts for the transferred funds in order to initiate the transfer. Also, when a customer establishes multiple accounts, decisions have to be made as to which account, for example, should provide overdraft protection and whether there should be secondary overdraft protection from a third account.

Thus, there is a need for multiple financial accounts that are seamlessly linked and appear as a unitary or near unitary account to the customer of a financial services entity.

SUMMARY

In one general aspect, embodiments of the present invention are directed to multiple financial accounts that are unified, or bundled, to appear as a single account from the perspective of a customer of the financial institution that administers the accounts. Embodiments of the present invention are also directed to methods for opening, or creating, such accounts.

In various embodiments, the present invention allows for financial accounts to be arrayed so that transactions relating to the accounts may be managed using a comprehensive transaction management system. Embodiments also allow for cross-account transaction integration of the accounts that is useful over multiple time horizons (i.e., short, medium and long term). In one embodiment, three accounts are seamlessly bundled—a spend account for daily transactions, a reserve account for short term savings and overdraft protection for the spend account, and a growth account for long term savings.

In various embodiments, the present invention is directed to a computer-assisted method of presenting a plurality of financial accounts as a unitary financial account. The method includes displaying, on a graphical display, a graphical representation of a first financial account and displaying, on the graphical display, a graphical representation of a second financial account, wherein the graphical representation of the first financial account and the graphical representation of the second financial account are displayed as a unitary graphical representation that conveys to a user that the first financial account and the second financial account are a partitioned unitary financial account. The method also includes enabling the user to transfer monetary funds between the first financial account and the second financial account by manipulation of the unitary graphical representation.

Those and other details, objects, and advantages of the present invention will become better understood or apparent from the following description and drawings showing embodiments thereof.

BRIEF DESCRIPTION OF THE DRAWINGS

Various embodiments of the present invention are described herein by way of example in conjunction with the following figures, wherein:

FIG. 1 illustrates a screen shot of an online or electronic banking interface in which embodiments of the present invention may be used;

DESCRIPTION

Figure 2:
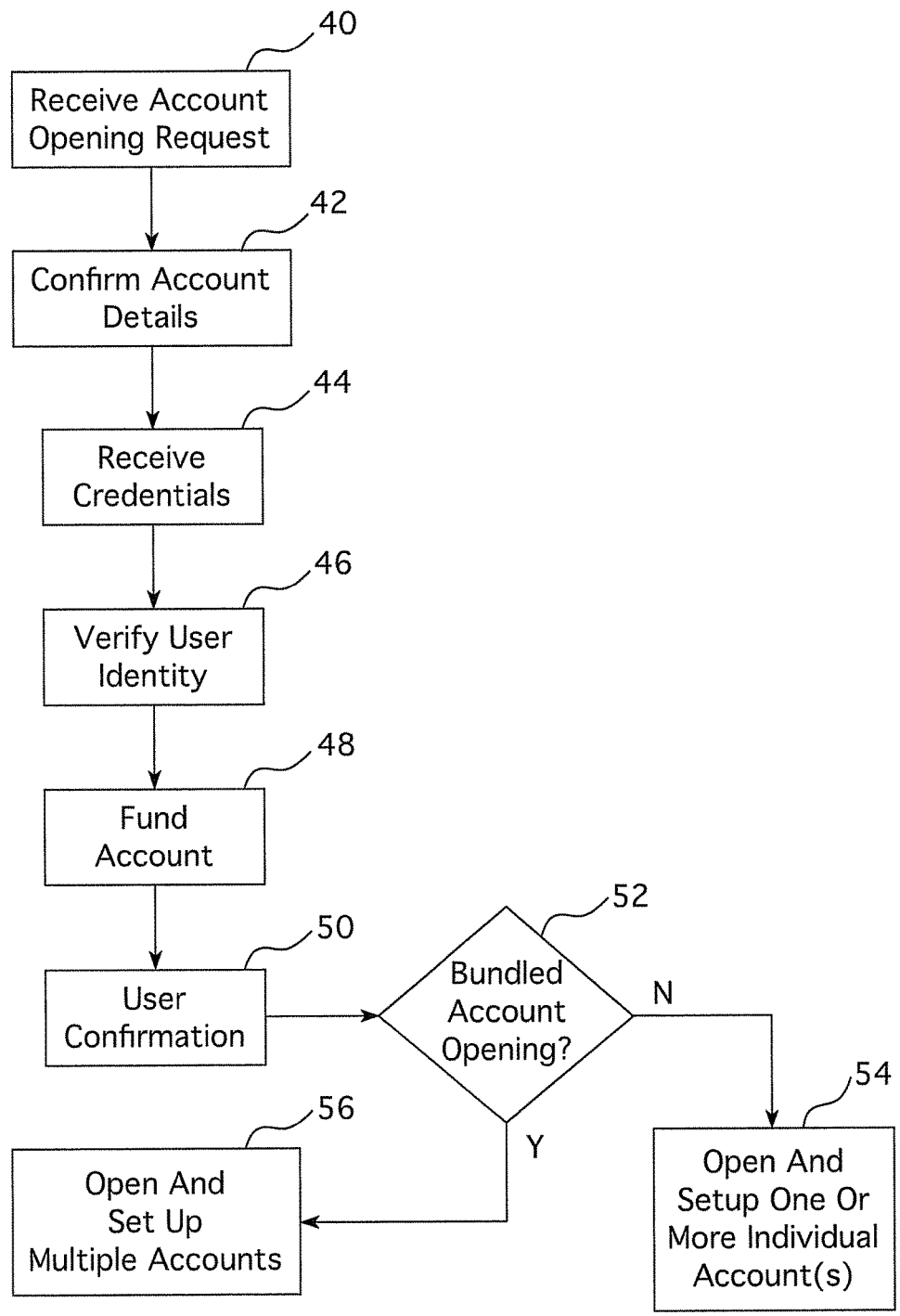
FIG. 2 illustrates a flowchart of an embodiment of a method for opening a bundled account.

In general, various embodiments of the present invention are directed to multiple financial accounts that are unified, or bundled, to appear as a single account from the perspective of a customer of the financial institution that administers the accounts. In one embodiment, a non-interest bearing checking account, an interest bearing checking account, and a savings or investment account are presented as a unified account to a customer of the financial institution that administers the accounts.

FIG. 1 illustrates a screen shot of an online or electronic banking interface in which embodiments of the present invention may be used. The screen illustrated in FIG. 1 may be implemented, for example, as a dynamic HTML web page and may be one of a plurality of linked screens that collectively define an online or electronic banking user interface. The screen of FIG. 1 is an interface that seamlessly presents three financial accounts to a user and permits the user to manipulate the funds, events, and information relating to the accounts without engaging in individual account manipulations.

As shown in FIG. 1, the three accounts are a checking, or debit, account, a reserve account, and a growth, savings or investment account. It can be understood that the account types are illustrative and any type of account may be used in connection with embodiments described herein. For example, the checking, or debit, account may be a non-interest bearing account, the reserve account may be an interest bearing account, and the growth account may be a savings, or investment account. In one embodiment, the growth account may have a reverse tier interest rate associated with the account such that the account yields a relatively high interest rate for balances below a certain threshold and a lower interest rate on balances above the threshold. In one embodiment the accounts may be set up such that the reserve account provides overdraft protection and the growth account provides secondary overdraft protection. In one embodiment, certain debit actions associated with the reserve account are prohibited, such as writing checks against the account and electronically paying bills against the account. The debit and reserve accounts are represented using a slide controller 10 and the growth account is represented using a graphic 11. A first portion 12 of the slide controller 10 represents the debit account balance and a second portion 14 of the slide controller 10 represents the reserve account.

The position of a thumb element 16 may be changed to redistribute funds between the debit and reserve accounts. To a user, redistribution of the funds in such a manner appears seamless because, although the funds are moved between the underlying accounts, the user does not have to explicitly move funds between the accounts. Graphical balance representations 18, 20 illustrate the amount of funds from the debit account that are scheduled out for payment and the amount of funds from the debit account that are free (i.e., have not been allocated to a debit).

In various embodiments, bill payment information may be presented textually. A scheduled-out graphic 22 may represent information regarding bill payments that are scheduled out for payment in the near term (e.g., until the next scheduled payday or within a predetermined time period measured from the current date), and a future scheduled out graphic 24 may present similar information for bill payments that are scheduled out for payment at later dates. A graphic 26 may indicate a portion of the reserve amount that may be allocated toward purchases anticipated in the future. In one embodiment, the portion of the reserve amount that is allocated toward purchases anticipated in the future may include funds from the growth account. In various embodiments, the user may select an item from the graphic 26 for purchase in the near future and the funds allocated to the purchase are transferred from the reserve or growth account to the debit account and the item is removed from the graphic 26. In one embodiment, the funds allocated toward the items listed on the graphic 26 are "locked" prior to the total goal amount actually being saved such that multiple steps need be performed by the user to transfer the funds to the debit account, thus making it more difficult for the user to spend the funds for a purpose other than the goal for which the funds are being saved.

FIG. 2 illustrates a flowchart of an embodiment of a method for opening a bundled account. The method illustrated in FIG. 2 may be performed when a customer desires to open an account using the Internet through an online interface or web page. At step 40, a request to open an account is received and at step 42 the account details are confirmed. For example, the type of account and various account details are presented to the user at step 42. At step 44 the user's credentials, or personal information (e.g., name, address, social security number, etc.) are received. At step 46, the identity of the user is verified. Verification may be performed by, for example, a third party credit reporting agency that presents various questions to the user, the answers to which only the user would know.

At step 48 the account is funded by, for example, the user specifying an electronic transfer of funds from a financial institution, by the user specifying the details of an electronic check, or in any appropriate manner. At step 50 a confirmation is presented to the user that provides details of the account information. The confirmation may be sent to the user by, for example, email, text message, a displayed web page, etc. At step 52, it is determined whether the customer had selected, at step 40, to open a bundled, or seamless account or to open one or more individual accounts. If the customer had selected to open one or more individual accounts, at step 54 each account is opened by the financial institution and each account is set up (e.g., account number (s) provisioned, overdraft protection specified, checks ordered, etc.) as per the user's instructions. If the customer had selected to open a bundled account, at step 56 multiple accounts are opened by the financial institution and the accounts are set up, including the linking of the accounts to present a seamless account interface to the user. In one embodiment, the customer is issued a debit card and the multiple bundled accounts are linked to the debit card. In such an embodiment, when the customer inserts the debit card into an ATM, a user interface is displayed that shows, for example, debit account, reserve account, and growth account balance and account information.

Figure 3:
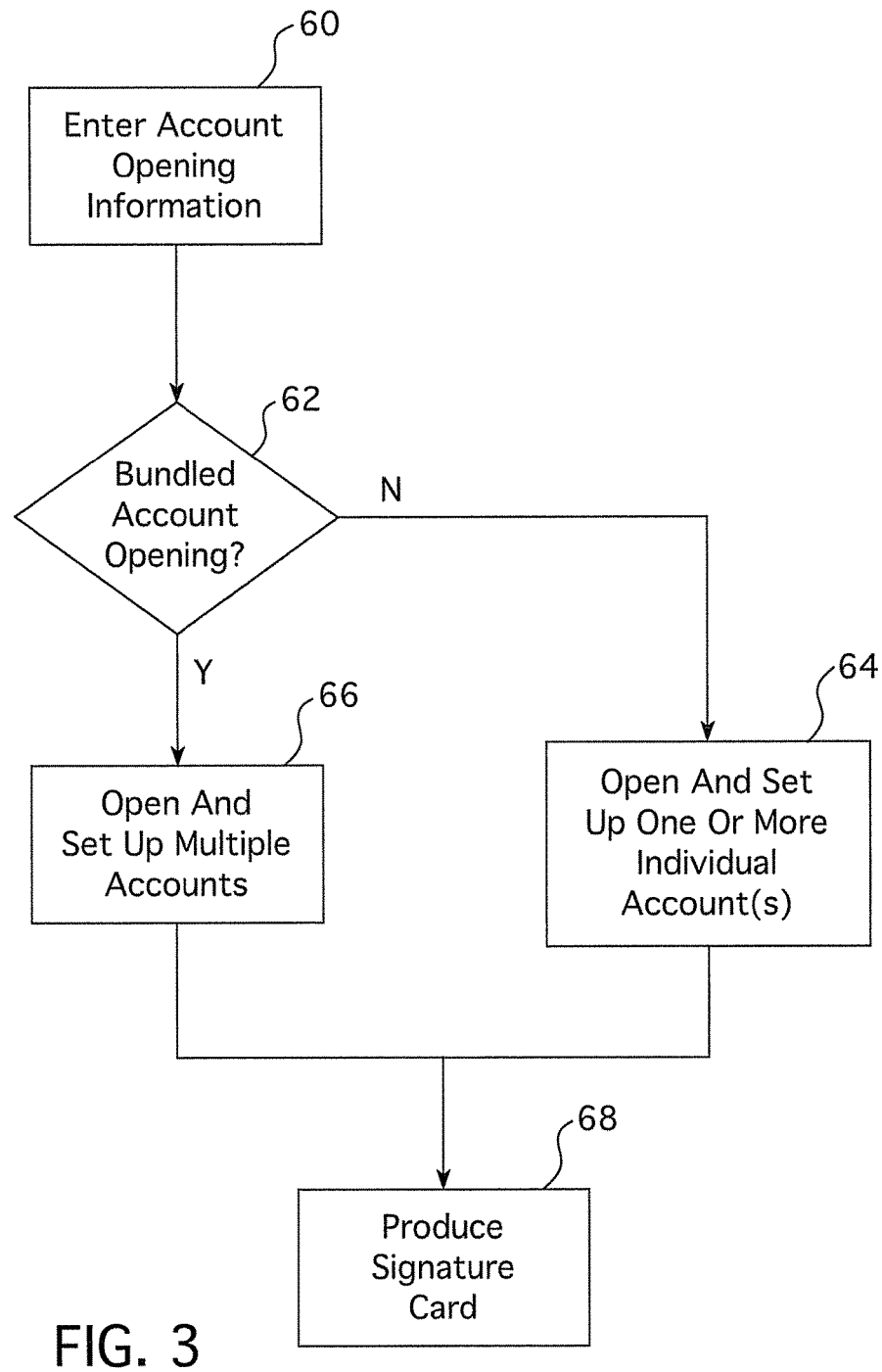
FIG. 3 illustrates a flowchart of another embodiment of a method for opening a bundled account.

FIG. 3 illustrates a flowchart of another embodiment of a method for opening a bundled account. The method illustrated in FIG. 3 may be performed when a customer desires to open an account at a physical bank location or, for example, by telephone. At step 60, a representative of the financial institution enters account opening information, including the type of account and the user's credentials. At step 62, the financial institution representative determines whether the customer decided to open a bundled, or seamless, account or to open one or more individual accounts. If the customer selected to open one or more individual accounts, at step 64 each account is opened by the financial institution and each account is set up (e.g., account number (s) provisioned, overdraft protection specified, checks ordered, etc.) as per the user's instructions. If the customer selected to open a bundled account, at step 66 multiple accounts are opened by the financial institution and the accounts are set up, including the linking of the accounts to present a seamless account interface to the user. At step 68, a signature card is generated for the customer. In the case of the customer opening a bundled account, the financial institution may generate one signature card for the multiple bundled accounts.

In the embodiments illustrated in FIGS. 2 and 3, in the case of bundled accounts the customer or the representative of the financial institution need only enter customer information once, instead of multiple times (i.e., one time for each type of account) and the multiple bundled accounts are opened and set up based on the customer information.

Figure 4:
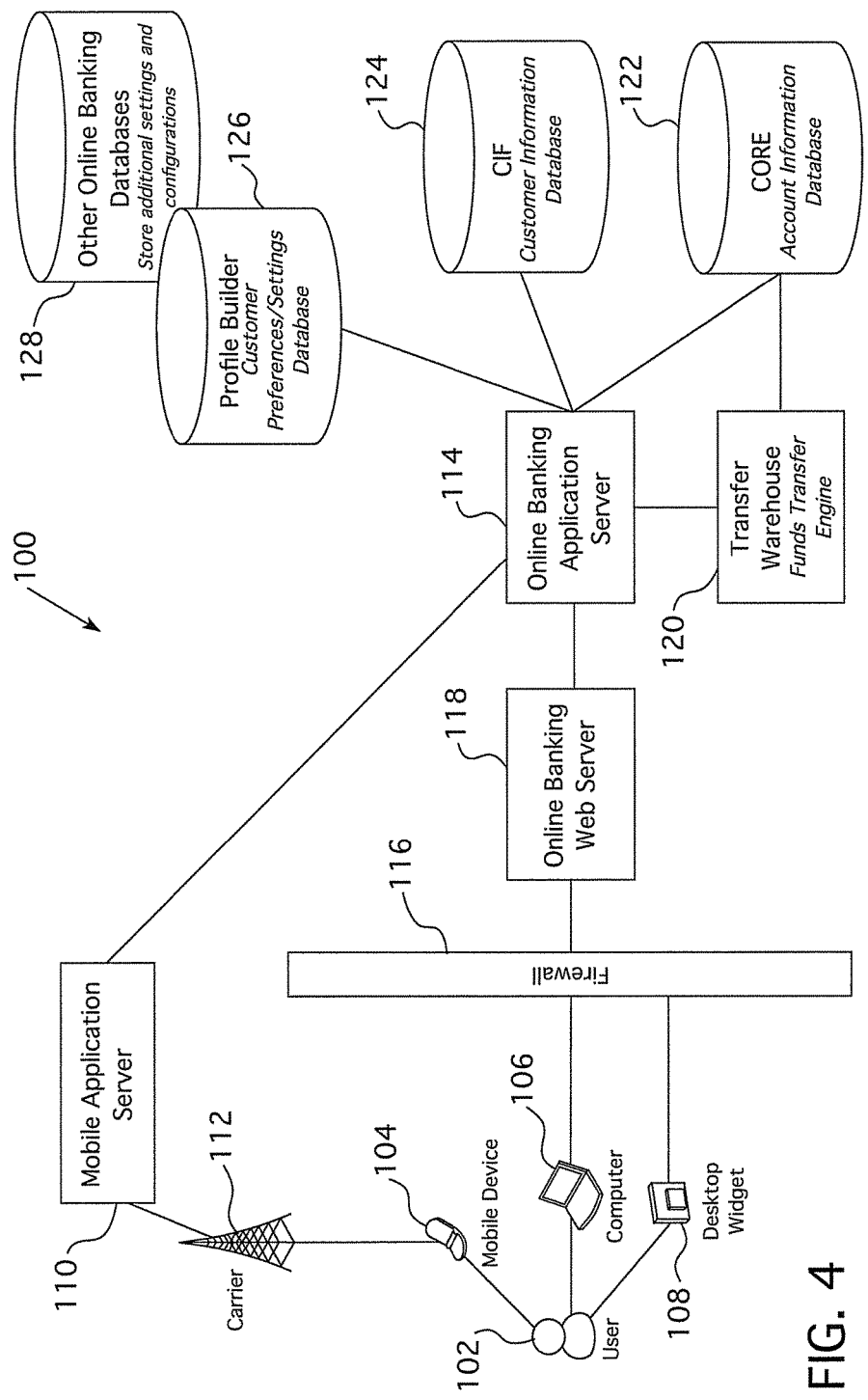
FIG. 4 illustrates an embodiment of a system in which embodiments of the present invention may be used.

FIG. 4 illustrates an embodiment of a system 100 in which embodiments of the present invention may be used. A user 102 utilizes a network-enabled client device with a display having a user interface, such as a mobile device 104, a computer 106, a desktop widget 108, or any other suitable device. The mobile device 104 accesses, via a mobile application server 110 and a wireless carrier 112, an online banking application server 114. The online banking application server 114 or a processor may present an interface to the user 102 that shows a plurality of bundled accounts seamlessly. The computer 106 and the desktop widget 108 access the online banking application server 114 via a firewall 116 protected online banking web server 118.

The online banking application server 114 is in communication with a transfer warehouse 120 (funds transfer engine), an account information database 122, a customer information database 124, a customer preferences/settings database 126, and other online banking databases 128 that store additional settings and configurations.

Embodiments of the present invention have the advantage that a new type of account does not need to be opened and maintained, but rather conventional accounts may be bundled into a unique arrangement and presented to customers in a seamless manner. Also, embodiments of the present invention have the advantage that growth (savings) account functionality and debit capability are offered using an apparent unitary account without being hampered by government regulations relating to the number of withdrawals permitted from a savings account.

Various embodiments of the present invention may be implemented on computer-readable media. The terms "computer-readable medium" and "computer-readable media" in the plural as used herein may include, for example, magnetic and optical memory devices such as diskettes, compact discs of both read-only and writeable varieties, optical disk drives, hard disk drives, etc. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

What is claimed is:

1. A computer-assisted method of presenting a plurality of financial accounts as a unitary financial account, the method comprising:
    displaying, on a graphical display by an online banking application server in communication with an account information database and a funds transfer engine, a graphical representation of a first financial account;
    displaying, on the graphical display by the online banking application server, a graphical representation of a second financial account, wherein the graphical representation of the first financial account and the graphical representation of the second financial account are displayed as a unitary graphical representation that conveys to a user that the first financial account and the second financial account are a partitioned unitary financial account, the unitary graphical representation comprising a slide controller having a first portion configured to be the graphical representation of the first financial account and a second portion configured to be the graphical representation of the second financial account, the unitary graphical representation having a thumb element configured to redistribute funds between the first financial account and the second financial account;
    enabling the user to transfer monetary funds between the first financial account and the second financial account by manipulation of the thumb element of the unitary graphical representation;
    wherein one of the first financial account or the second financial account has a reverse tier interest rate associated therewith; and
    displaying, on the graphical display by the online banking application server, a graphical representation of a third financial account, wherein the graphical representation of the first financial account, the graphical representation of the second financial account and the graphical representation of the third financial account are displayed as a unitary graphical representation that conveys to a user that the first financial account, the second financial account, and the third financial account are a partitioned unitary financial account.

2. The computer-assisted method of claim 1, wherein the first financial account is one of a debit account, a savings account, a checking account, and an investment account.

3. The computer-assisted method of claim 1, wherein the second financial account is one of a debit account, a savings account, a checking account, and an investment account.

4. The computer-assisted method of claim 1, wherein the first financial account is a spending account, the second financial account is a reserve account, and the third financial account is a growth account.

5. A system for presenting a plurality of financial accounts as a unitary financial account, the system comprising:
    a graphical display;
    an online banking application server in communication with the graphical display, a funds transfer engine, and an account information database, the server configured to:
        display, on the graphical display, a graphical representation of a first financial account;
        display, on the graphical display, a graphical representation of a second financial account, wherein the graphical representation of the first financial account and the graphical representation of the second financial account are displayed as a unitary graphical representation that conveys to a user that the first financial account and the second financial account are a partitioned unitary financial account, the unitary graphical representation comprising a slide controller having a first portion configured to be the graphical representation of the first financial account and a second portion configured to be the graphical representation of the second financial account, the unitary graphical representation having a thumb element configured to redistribute funds between the first financial account and the second financial account;
        display, on the graphical display, a graphical representation of a third financial account, wherein the graphical representation of the first financial account, the graphical representation of the second financial account and the graphical representation of the third financial account are displayed as a unitary graphical representation that conveys to a user that the first financial account, the second financial account the third financial account are a partitioned unitary financial account; and
        access the funds transfer engine to enable the user to transfer monetary funds between the first financial account and the second financial account by manipulation of the thumb element of the unitary graphical representation; and
    wherein one of the first financial account and the second financial account has a reverse tier interest rate associated therewith.

6. The system of claim 5, wherein the graphical display is a mobile communications device.

7. An apparatus for presenting a plurality of financial accounts as a unitary financial account, the apparatus comprising:
    means for displaying, on a graphical display, a graphical representation of a first financial account;
    means for displaying, on the graphical display, a graphical representation of a second financial account, wherein the graphical representation of the first financial account and the graphical representation of the second financial account are displayed as a unitary graphical representation that conveys to a user that the first financial account and the second financial account are a partitioned unitary financial account, the unitary graphical representation comprising a slide controller having a first portion configured to be the graphical representation of the first financial account and a second portion configured to be the graphical representation of the second financial account, the unitary graphical representation having a thumb element configured to redistribute funds between the first financial account and the second financial account;

means for enabling the user to transfer monetary funds between the first financial account and the second financial account by manipulation of the thumb element of the unitary graphical representation;

wherein one of the first financial account and the second financial account has a reverse tier interest rate associated therewith; and means for displaying, on the graphical display, a graphical representation of a third financial account, wherein the graphical representation of the first financial account, the graphical representation of the second financial account and the graphical representation of the third financial account are displayed as a unitary graphical representation that conveys to a user that the first financial account, the second financial account the third financial account are a partitioned unitary financial account.

8. The apparatus of claim 7, wherein the first financial account is one of a debit account, a savings account, a checking account, and an investment account.

9. The apparatus of claim 7, wherein the second financial account is one of a debit account, a savings account, a checking account, and an investment account.

10. The apparatus of claim 7, wherein the first financial account is a spending account, the second financial account is a reserve account, and the third financial account is a growth account.

11. The apparatus of claim 7, wherein the graphical display is a graphical display portion of a mobile communications device.

12. A computer readable medium having stored thereon instructions which, when executed by a processor of an online banking application server connected to an account information database and a funds transfer engine, cause the processor to:

display, on a graphical display by the online banking application server, a graphical representation of a first financial account;

display, on the graphical display by the online banking application server, a graphical representation of a second financial account, wherein the graphical representation of the first financial account and the graphical representation of the second financial account are displayed as a unitary graphical representation that conveys to a user that the first financial account and the second financial account are a partitioned unitary financial account, the unitary graphical representation comprising a slide controller having a first portion configured to be the graphical representation of the first financial account and a second portion configured to be the graphical representation of the second financial account, the unitary graphical representation having a thumb element configured to redistribute funds between the first financial account and the second financial account;

enable the user to transfer monetary funds between the first financial account and the second financial account by manipulation of the thumb element of the unitary graphical representation; and display, on the graphical display by the online banking application server, a graphical representation of a third financial account, wherein the graphical representation of the first financial account, the graphical representation of the second financial account and the graphical representation of the third financial account are displayed as a unitary graphical representation that conveys to a user that the first financial account, the second financial account the third financial account are a partitioned unitary financial account;

wherein one of the first financial account and the second financial account has a reverse tier interest rate associated therewith; and wherein the computer readable medium is one of a magnetic memory device or an optical memory device.

* * * * *